United States Patent
Gonidec et al.

[19]

[11] Patent Number: 6,065,285
[45] Date of Patent: May 23, 2000

[54] THRUST REVERSER FOR TURBOJET ENGINE HAVING SCOOP-FORMING DOORS COOPERATING WITH MOVABLE FLOW DEFLECTING BAFFLES

[75] Inventors: Patrick Gonidec, Montivilliers; Jean Fabrice Marcel Portal, Ste Adresse; Vincent Joseph Rodolphe Studer; Guy Bernard Vauchel, both of Le Havre, all of France

[73] Assignee: Hispano Suiza Aerostructures, France

[21] Appl. No.: 09/092,136

[22] Filed: Jun. 5, 1998

[30] Foreign Application Priority Data

May 6, 1997 [FR] France .................................. 97 06943

[51] Int. Cl.⁷ ........................................................ F02K 3/02
[52] U.S. Cl. ..................... 60/226.2; 60/230; 239/265.29; 239/265.37
[58] Field of Search ................................... 60/226.7, 262, 60/229, 230, 232; 239/265.29, 265.37, 265.39

[56] References Cited

U.S. PATENT DOCUMENTS

| | | | |
|---|---|---|---|
| 3,601,992 | 8/1971 | Maison | 60/230 |
| 3,739,582 | 6/1973 | Maison | 60/226.2 |
| 4,894,985 | 1/1990 | Dubois et al. | |
| 5,003,770 | 4/1991 | Schegerin et al. | |
| 5,039,171 | 8/1991 | Lore | 239/265.29 |
| 5,893,265 | 4/1999 | Gonidec et al. | 60/226.2 |

FOREIGN PATENT DOCUMENTS

| | | |
|---|---|---|
| 0 771 945 | 5/1997 | European Pat. Off. . |
| 2 752 017 | 2/1998 | France . |

*Primary Examiner*—Charles G. Freay
*Attorney, Agent, or Firm*—Bacon & Thomas PLLC

[57] ABSTRACT

The invention relates to a bypass turbojet engine having pivoting, hollow thrust reverser doors which, in the forward thrust configuration, are integrated into the external engine cowling and which, in the reverse thrust configuration, constitute scoop baffles that deflect exhaust air flow. A movable deflector baffle cooperates with each door such that, when the door is opened towards a thrust reversing direction, the baffle moves above an outer surface of the outer panel of the door in such a way that undesired interference between the exhaust flow moving through the door and the flow deflected by the outer surface of the door is minimized or avoided.

15 Claims, 6 Drawing Sheets

THRUST REVERSER FOR TURBOJET ENGINE HAVING SCOOP-FORMING DOORS COOPERATING WITH MOVABLE FLOW DEFLECTING BAFFLES

BACKGROUND OF THE INVENTION

The present invention concerns a thrust reverser for a bypass turbofan type turbojet engine. The turbojet engine is fitted at the rear of the fan with a duct to channel the so-called cold bypass flow, the duct consisting of an inner wall enclosing the structure of the engine proper at the rear of the fan and of an outer wall of which the upstream portion is continuous with the engine cowling enclosing the fan. This outer wall can simultaneously channel the bypass flow and the downstream primary flow rearward of the so-called hot, primary flow exhaust in the case, for instance, of mixed or confluent flows, but in other cases the outer wall may only channel the bypass flow, specifically in the case of separated flow cowlings.

Furthermore, a wall may fair the engine exterior, that is the outside of the cowling enclosing the fan and the outside of the outer wall of the above-described duct, in order to minimize power plant drag. This would be the case for power plants mounted on the outside of the aircraft, in particular when these power plants are affixed underneath the wings or to the rear of the aircraft fuselage.

French patent application No. 9609705 published as FR 2 752 017 on Feb. 6, 1998 discloses an embodiment illustrated in FIG. 1 of the attached drawings of a thrust reverser having scoop-forming doors, hereinafter called scoop doors, said thrust reverser being associated with a bypass turbojet engine.

As illustrated in FIG. 1, the thrust reverser includes a movable subassembly and a stationary structure. The movable subassembly includes hollow doors 3 that form a movable part 2 and, in the forward thrust mode, also form an outer portion of the cowling. The fixed structure includes an upstream part 6 upstream of the doors 3, a downstream part 7 downstream of the doors 3 and longitudinal beams (not shown) connecting the upstream part 6 to the downstream part 7, the fixed structure also constituting a part of the outer fairing.

The doors 3 are located along a circumference of the outer fairing of the cowling and are pivotally mounted within a zone between their side walls on the beams connecting the downstream part 7 to the upstream part 6 of the outer fairing. Side walls located on opposite sides of the doors connect the outer surface or outer panel 4 of the doors 3 that form a portion of the outer cowling to the inner part 5 of the doors 3 that form an outer portion of the bypass duct wall.

The fixed upstream part 6 comprises a forward frame 8 which may be used as a support for control means used to actuate or displace the doors 3, for example linear actuators. These control means displacing the doors 3 likewise can be located on other sides of the periphery of the door 3, for example downstream of the door. In such a case, the support for the control means will be provided by the fixed downstream part 7.

When driven into a thrust reversal position, the doors 3 pivot in such a manner that a portion of the doors upstream of the pivots 9 more or less fully obstruct the bypass duct while opening a passage in the external cowling in such a way as to channel the bypass flow 13 and 14 respectively laterally or outwardly relative to the duct axis through, on one hand, the duct 10 in the door 3 and, on the other hand, through the opening between the edge of the opening and the outside surface 4 of the door 3. The downstream door portion moves to the vicinity of the external side of the cowling in the thrust reverse position. The door angular excursion is adjusted to assure a bypass flow passage and to strongly reduce and even suppress the forward thrust from this flow, while generating a reverse thrust by producing an upstream directed flow component.

Because of the constraints on the excursion of the door dictated by aerodynamic considerations, including the dimensions of the flow passages opened by the upstream door portion in the thrust reversal position, the above-described thrust reverser includes a downstream protruding shape 12 downstream of the forward frame 8. A more or less pronounced stagnant air zone 11, typically found in conventional door designs in this zone, effectively reduces the cross-section of the passage for flow 14 while limiting the angle of reversal of flow 14 toward the front of the cowling. This stagnant zone 11 effectively forms an aerodynamic plug reducing the effective cross-section of the reverse flow stream.

Some aerodynamic degradation also is caused by this limitation on the effective cross-section of the thrust reversal flow. The thrust reversal flow 14 deflected outwardly by the outer surface 4 of the door is affected by the aerodynamic plug where the flow 14 meets the outward flow 13b exiting the door conduit 10. The flow 14 is caused by the plug to interfere with the reverse thrust flow 13b in a forward direction by merging against such flow.

SUMMARY OF THE INVENTION

An objective of this invention is to increase the aerodynamic performance of the scoop doors when they are in the thrust reverse position without incurring the disadvantages of the prior art. This objective is achieved in accordance with the invention by providing scoop doors that each cooperates with a displaceable baffle which, as each door is pivoted towards an open reverse thrust position, will move above the outer door surface in a way so as to limit or avoid any interference between exhaust flow directed through the door and the exhaust flow deflected by the outside surface of the door.

BRIEF DESCRIPTION OF THE DRAWINGS

Other features and advantages of the invention are described below in connection with the appended drawings, wherein.

DETAILED DESCRIPTION OF THE PREFERRED EMBODIMENTS OF THE INVENTION

Figure 1:
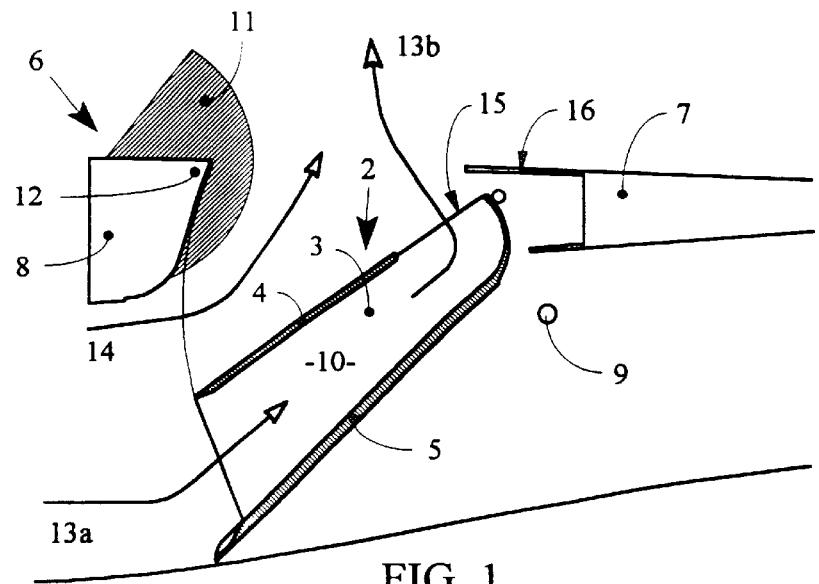
FIG. 1 is a partial schematic view taken along a longitudinal section of a bypass turbojet engine in a plane passing through the axis of rotation of the associated engine and through a pivoting scoop door thrust reverser shown in its open or thrust reverse position of a known type as described above.

In accordance with the embodiment of the invention shown in FIGS. 2, 3, 4 and 5, an exhaust scoop door 3 of the type previously described is pivoted on a pivot shaft 9 connected to the side beams (not shown) of the fixed structure 6 of a bypass turbojet engine thrust reverser drives and supports, by means of at least two lateral linkage rods 20 and 21 pivoted at 22 and 23 on the door 3, a movable flow deflecting baffle 24 at respective pivotal connection points 25 and 26.

Figure 2:
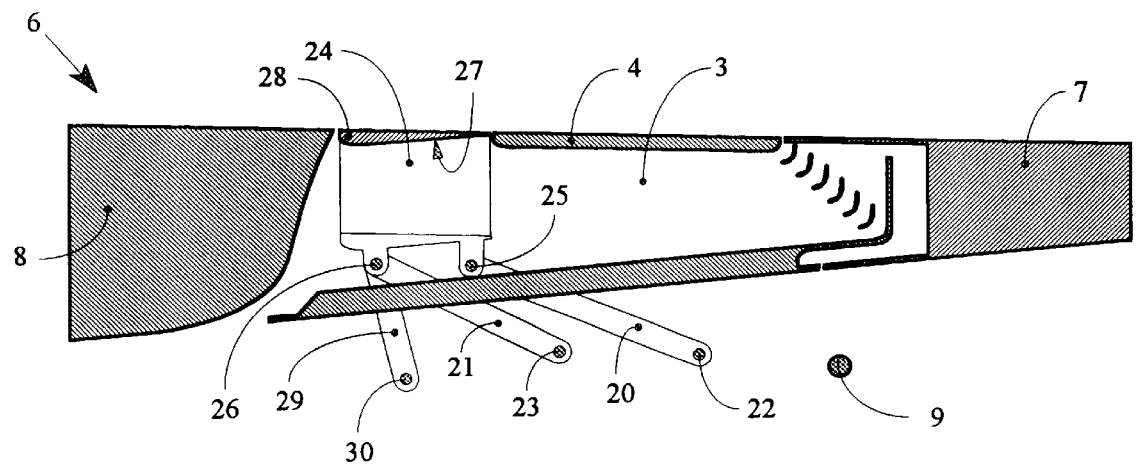
FIG. 2 is a view similar to FIG. 1 of a scoop door thrust reverser shown in the closed position and illustrating one embodiment of the invention.
Figure 3:
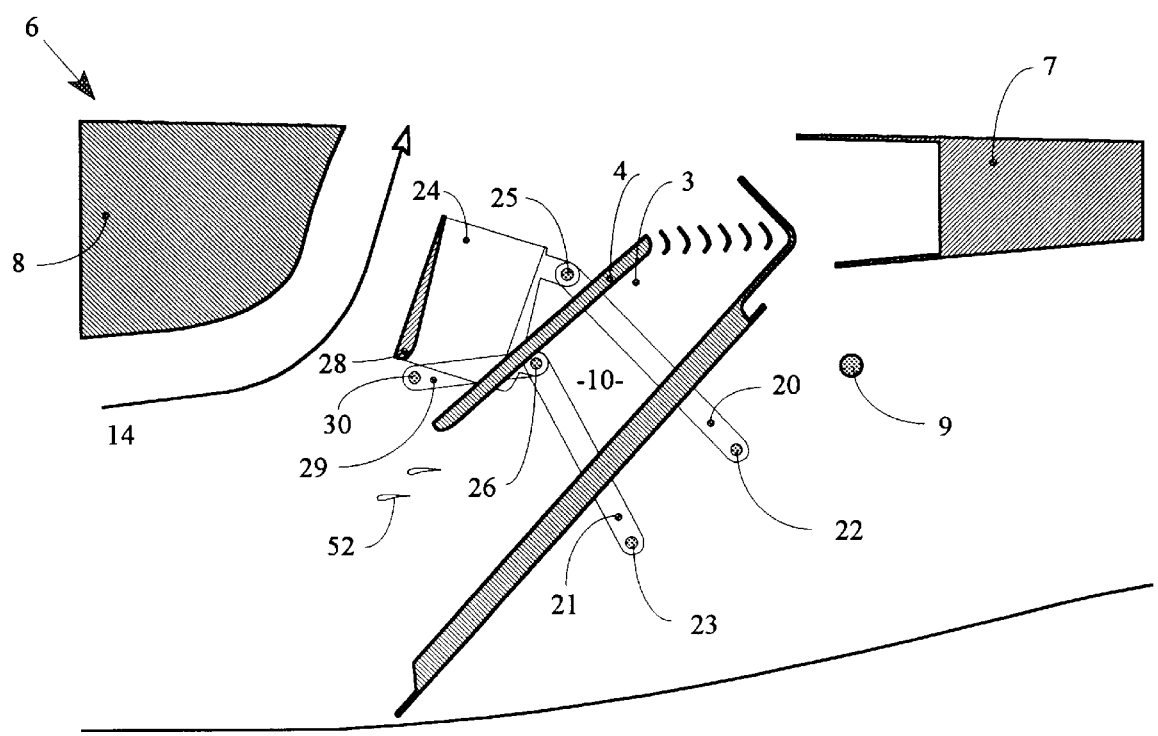
FIG. 3 shows the embodiment of FIG. 2 in the thrust reversal mode.
Figure 4:
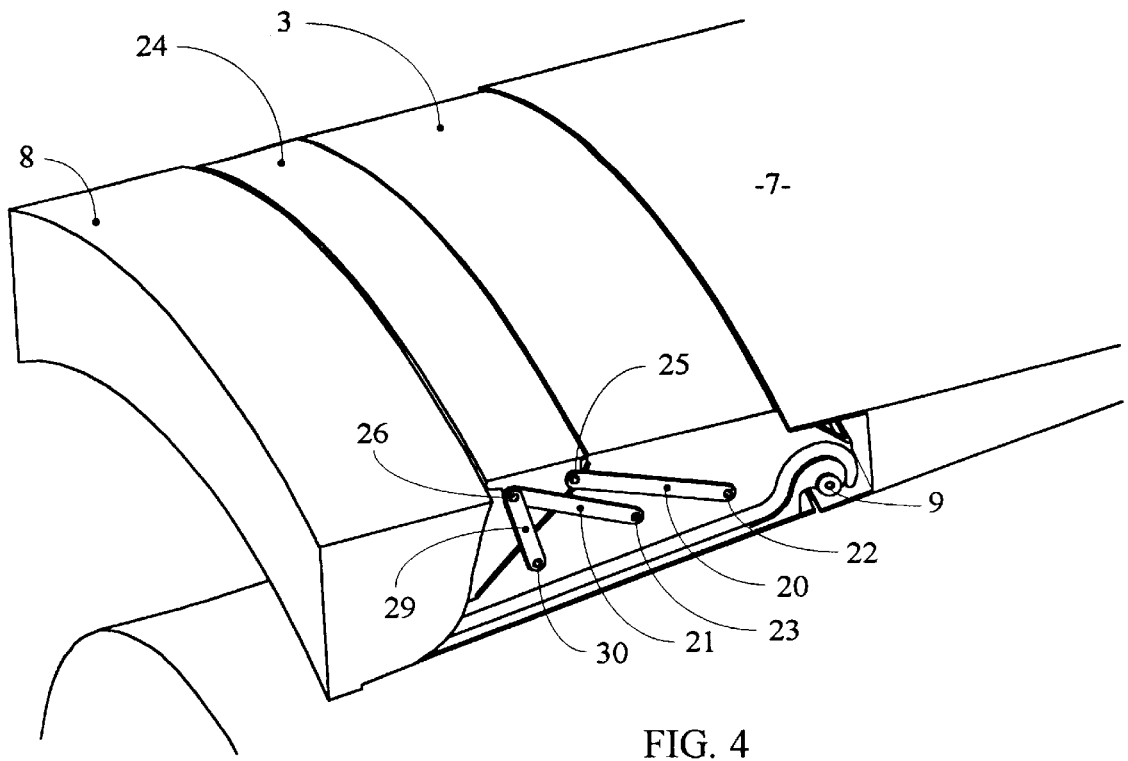
FIGS. 4 and 5 are perspective views of the embodiments shown in FIGS. 2 and 3.
Figure 5:
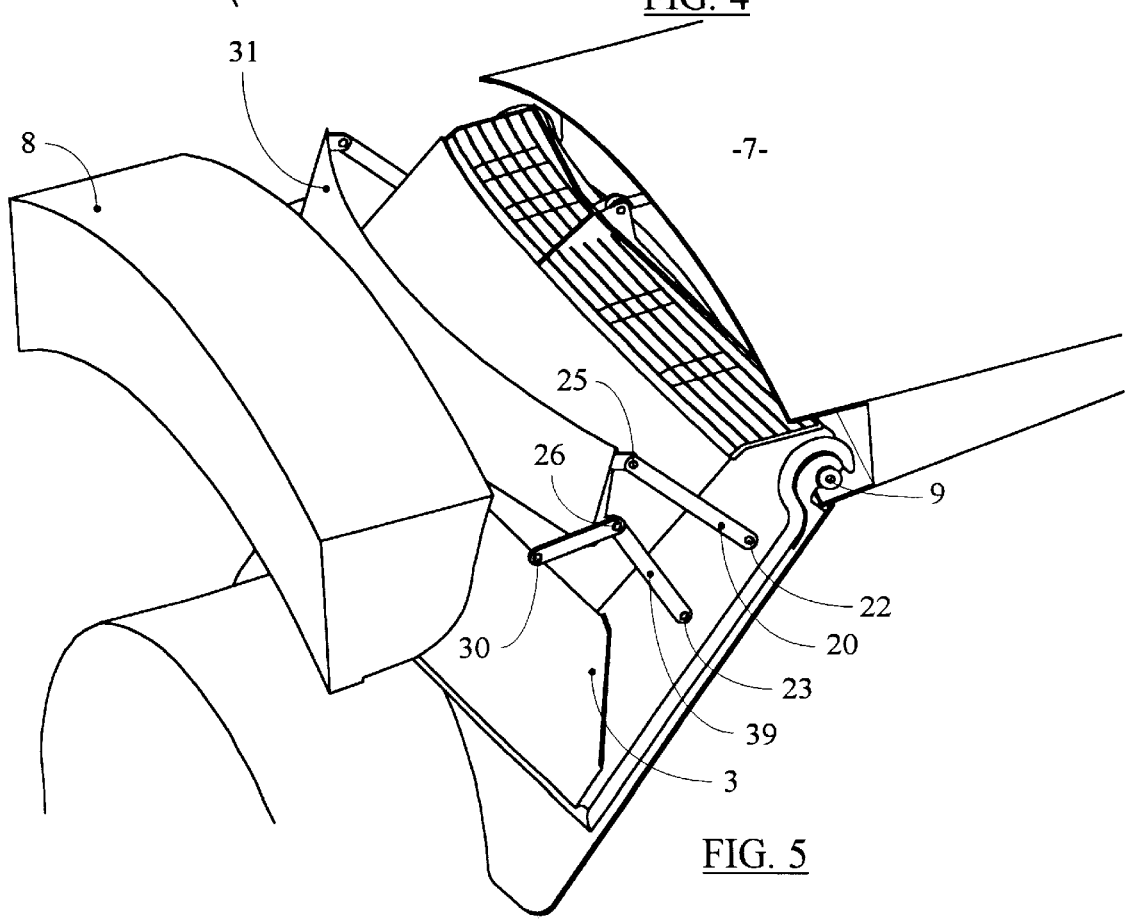

In the forward thrust mode (doors closed), the outside of the baffle 24 constitutes part of the outer cowling (FIG. 2). The inside surface 27 of the baffle 24 has a shape designed to assure the thrust reversal performance as desired by those skilled in the art and it may cooperate with other aerodynamic components such as a vane or vanes which may be mounted on the baffle itself. The length of the baffle is not limited in both upstream and downstream directions, depending only on the design selected by the skilled person with due regard for its spatial position and its environment. Moreover, the final upstream and downstream fit of the displaceable baffle should include appropriate geometry needed to obtain desired performance. The position of the baffle in its displaced or reverse thrust position is determined so as to optimally assist in guiding a portion of the deflected flow in a desired direction.

The upstream edge 28 of the displaceable baffle 24 may cover part of the frame without interfering with the fixed structure showing door movement. This design allows the partial reduction of the protruding shape 12 previously described and shown in FIG. 1. To allow an increase of the flow 13 passing through the door duct or nozzle 10 when the door is in the thrust reverse position, at least one vane 52 (see FIG. 3) may be mounted in the door duct 10 beneath the baffle 24 when the baffle is in the forward thrust position. The vane 52, being uncovered when the door is in its thrust reverse position, will guide part of the thrust reverse flow in any desired direction that may be selected by one skilled in the art, including toward the door interior or toward the outside of the rear of the displaceable baffle 24. Moreover, vane 52 may provide an aerodynamic reaction torque to assist actuation of the door from a thrust reverse position to a closed position.

An additional baffle motion control and guiding linkage rod 29 pivotally connected to fixed structure 6 by the pivot 30 is connected to the movable subassembly including the displaceable baffle 24 and rods 20, 21 at any location that permits achievement of the kinematics desired by the person skilled in the art to control baffle movement. In the preferred embodiment, the location is shown as the pivot 26 of the rod 21. This design causes the upstream edge of the baffle 24 to pivot in a centripetal (inward) direction relative to the cowling during inward door movement. In this configuration, the baffle is able to guide part of the flow 14 toward the cowling exterior in an outward direction providing improved aerodynamic performance and furthermore with less interference with the reverse thrust flow exiting the interior of the door 3, whereby the effectiveness of the latter flow is improved. Likewise, the upstream edge 28 of displaceable baffle 24 contacts the outer panel 4 of the door to preclude the flow 14 from passing between the two parts.

By modifying the configuration and the parameters of the guide rod links, a person skilled in the art can implement rotation of the downstream side of the displaceable baffle 24 inwardly relative to the cowling and position it near the outer surface or panel 4 of the door 3 to make the baffle airtight with said panel 4 and to direct the flow 14 more effectively in a forward direction.

The baffle 24 may be integrally located upstream of the door structure as shown in FIGS. 2 through 5. It may straddle part of the outer door structure or it may be located in a zone between the upstream and downstream areas of the structure of the outer surface or panel 4. In the latter case, the baffle 24 advantageously may be hinged directly to the outer surface 4 of the door 3 at the upstream or downstream side of the door as may be appropriate. Moreover, the vanes 52 may be placed inside the duct 10 of the door structure in the vicinity of the opening created by movement of the displaceable baffle 24 to optimize guidance of part of the reverse flow passing through the inner door duct 10.

In the embodiment of FIG. 2, the pivot 30 linking the baffle 24 to the fixed structure 6 is located toward the upstream end of the baffle. This configuration permits the use of the inner surface 27 to assist in holding the door during its initial displacement or reclosing and thereby reduces the stresses imposed on the linear actuator or movement system during this stage of the operation.

Placing the baffle 24 at the upstream end of the door 3 also may improve aerodynamic flow at the beginning of the door opening by immediately clearing an opening area to the exterior of the cowling.

Figure 8:
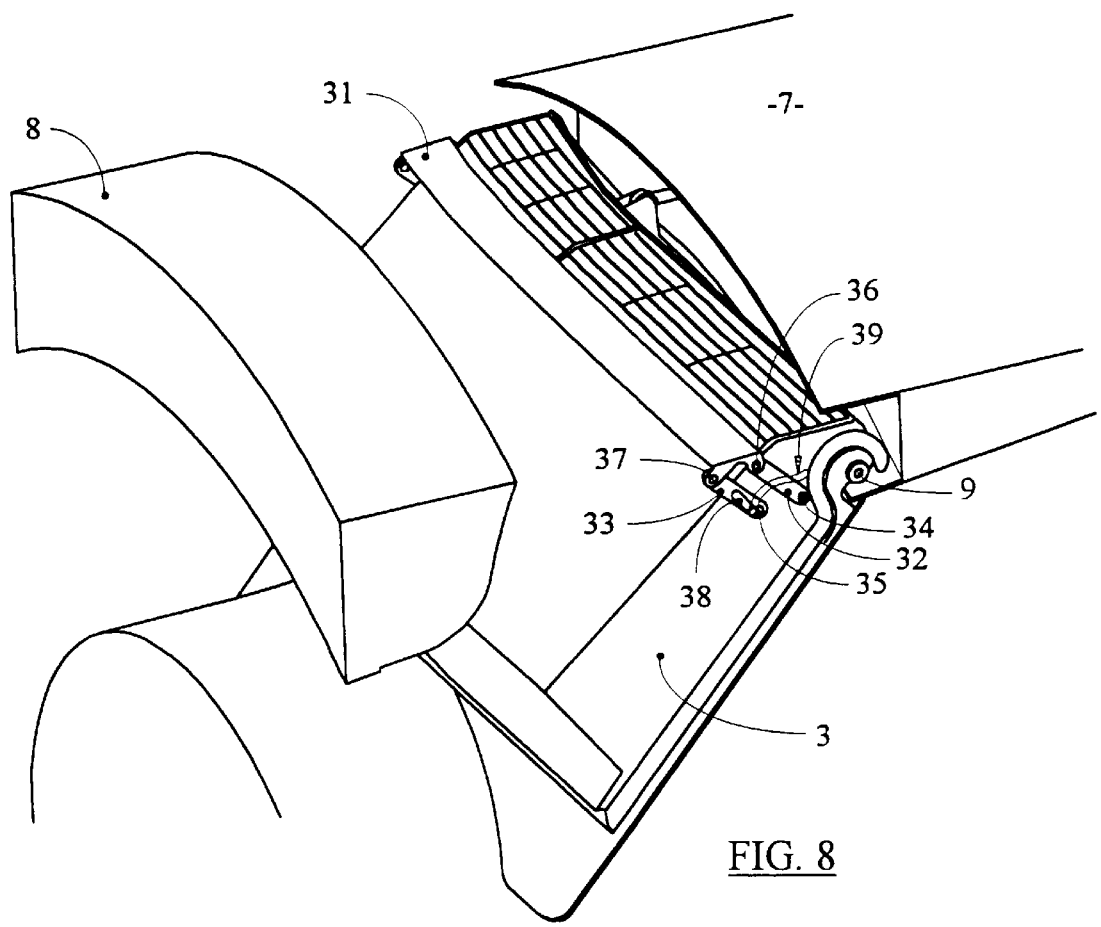
FIG. 8 is a perspective view of the embodiment shown in FIGS. 6 and 7 in the thrust reverse position.
Figure 6:
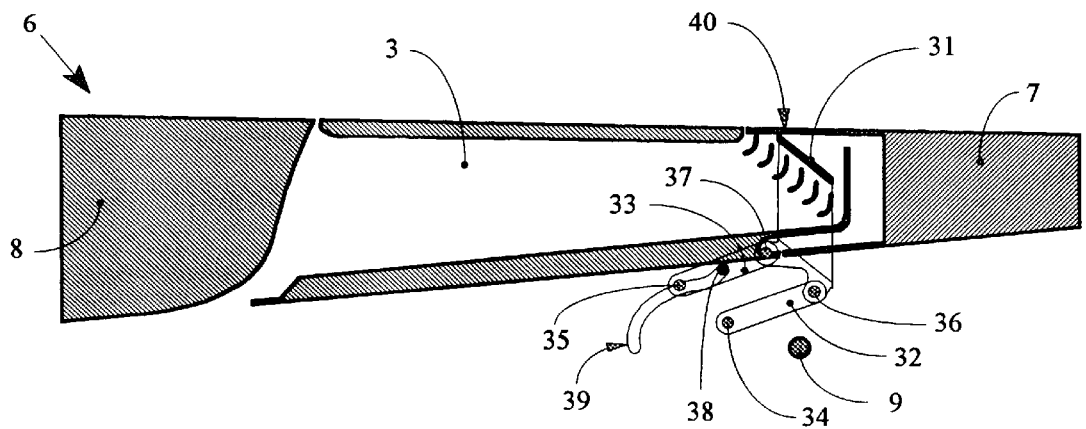
FIG. 6 is a view of an alternate embodiment of the invention similar to FIG. 1 showing the scoop door thrust reverser in a closed position.
Figure 7:
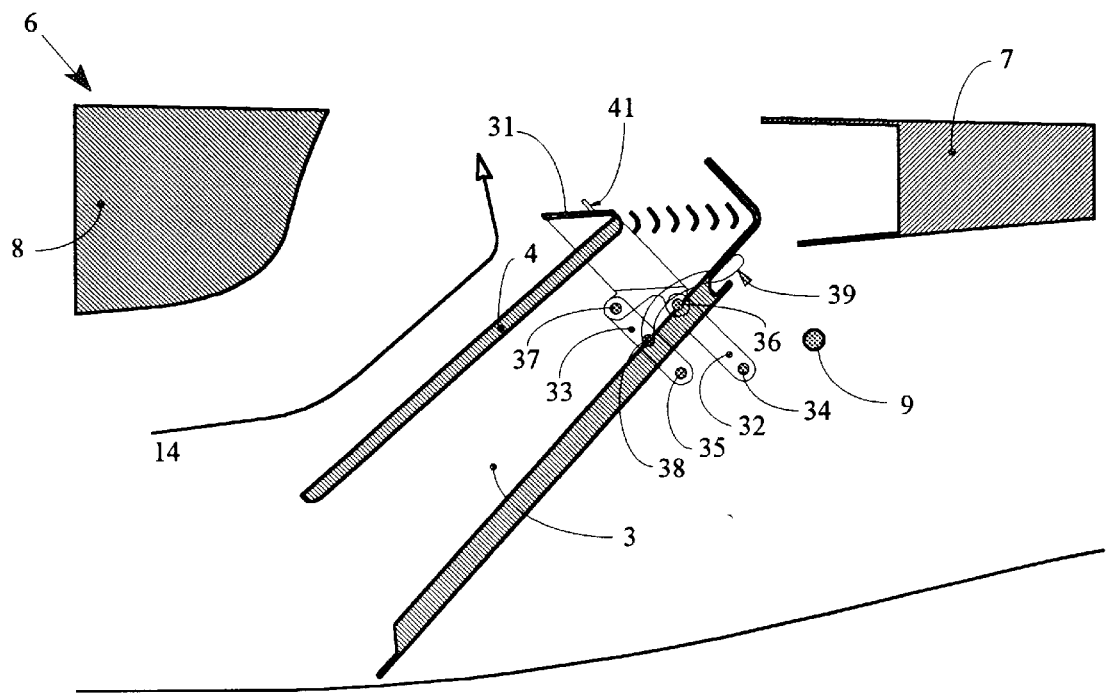
FIG. 7 shows the embodiment of FIG. 6 in the thrust reverse position.
Figure 9:
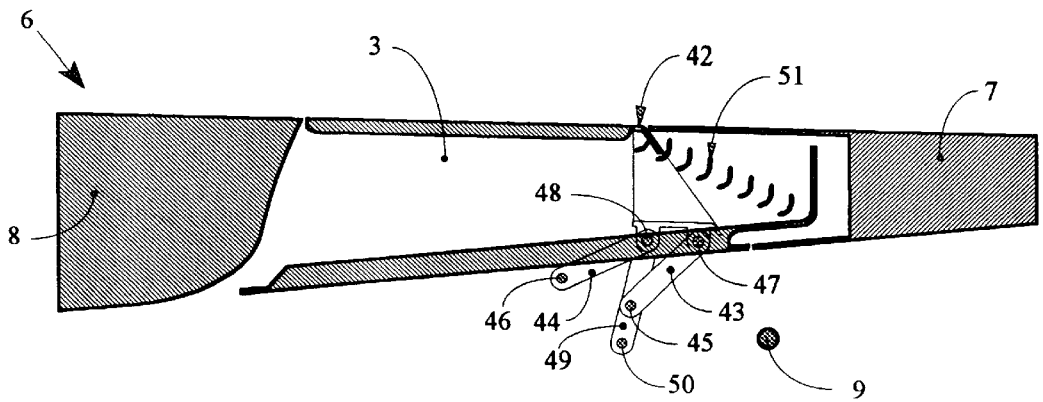
FIG. 9 is a view similar to FIG. 1 showing a scoop door thrust reverser in accordance with another embodiment of the invention in a closed position.
Figure 10:
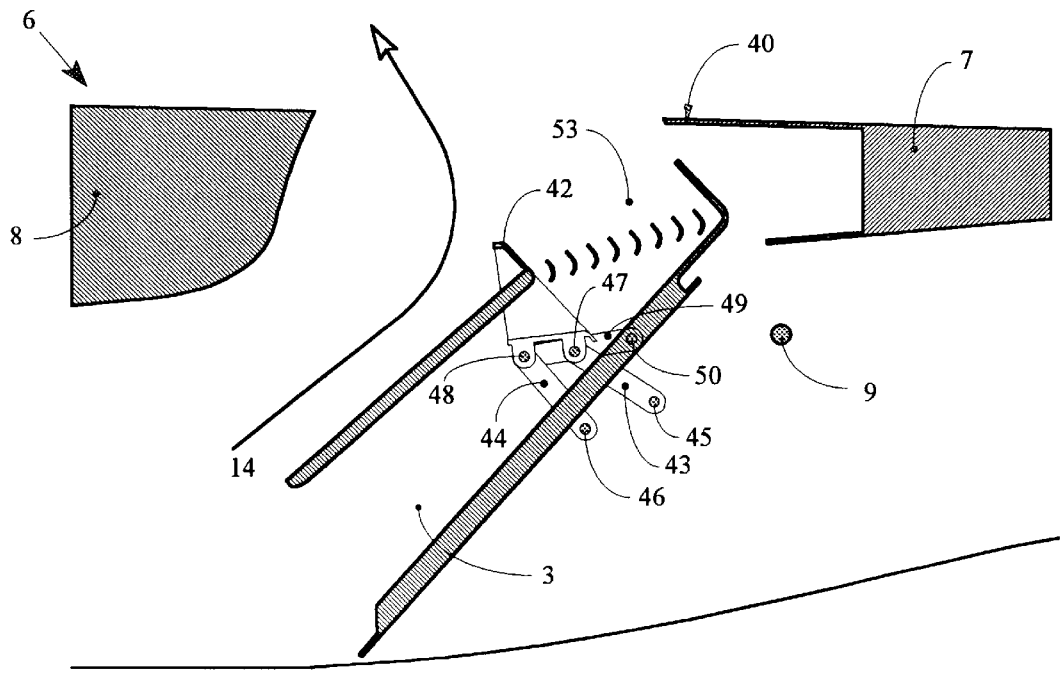
FIG. 10 shows the embodiment of FIG. 9 in the thrust reverse position.
Figure 11:
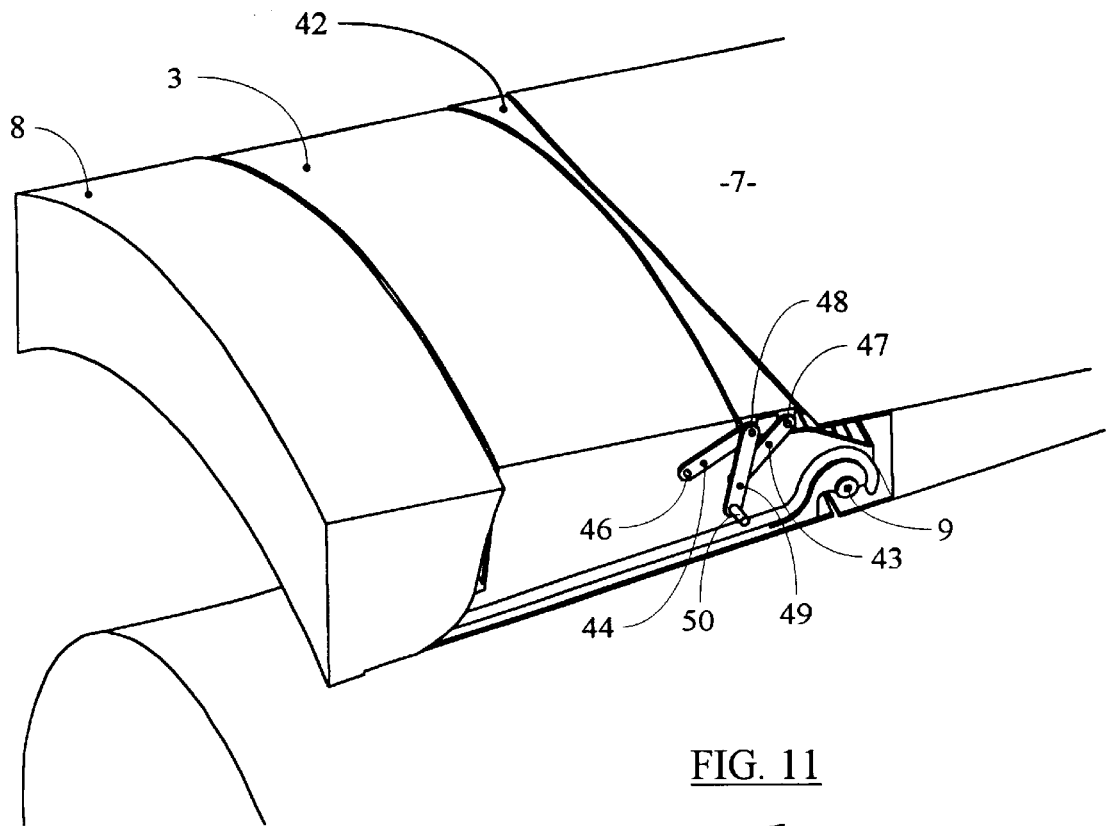
FIGS. 11 and 12 are perspective views of the embodiment of FIGS. 9 and 10.
Figure 12:
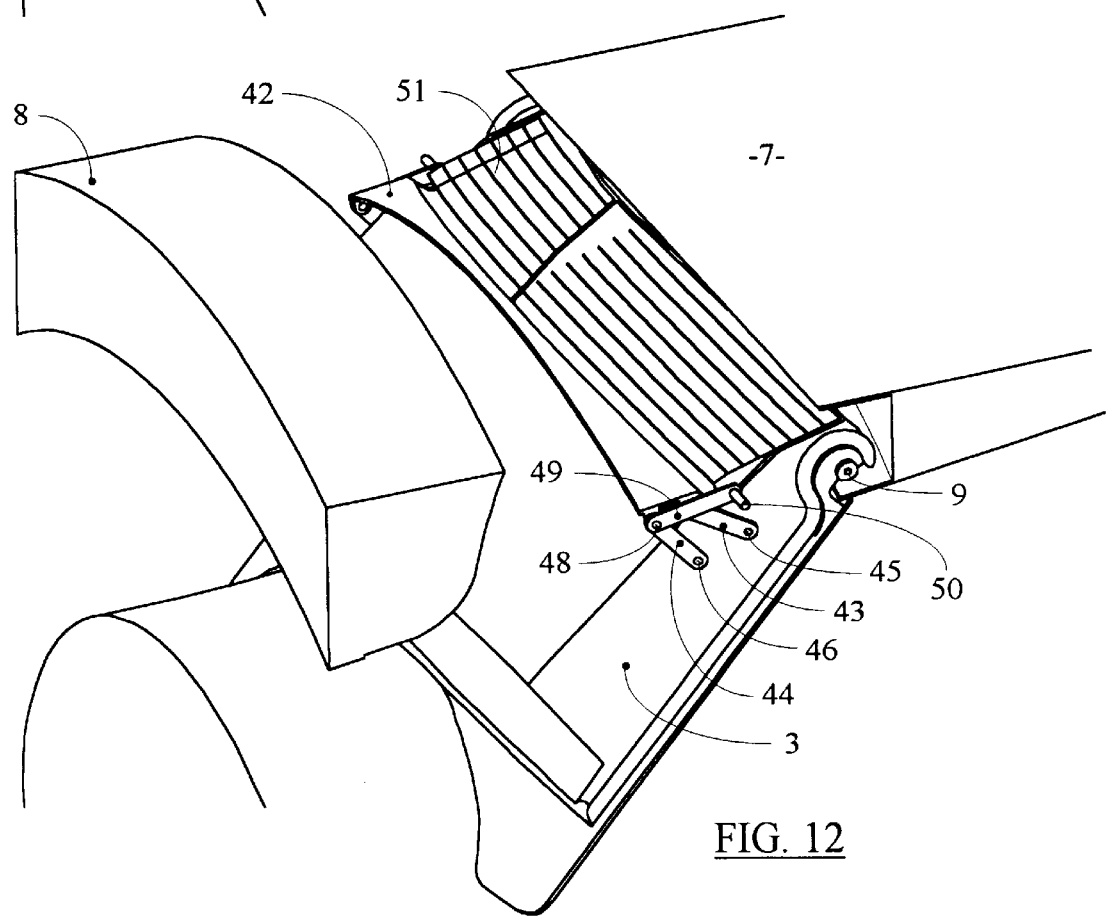

FIGS. 6 through 8 show another embodiment of the invention. When the thrust reverser is in the forward thrust mode, a displaceable baffle 31 is located underneath the stationary visor 40 of the rear cowling shroud 7. At least two pivoted linkage rods 32 and 33 connected between the door 3 and hinged at 34, 35 respectively guide and direct the baffle 31 through pivot points 36 and 38 connecting the rods 32 and 33 to the baffle 31. In this embodiment, the baffle is also driven by a cam follower roller 38 fitted to linkage rod 33 and sliding in a curved cam slot 39 in the fixed structure of the thrust reverser when the door 3 is moved.

This guidance system provides an advantage over the system comprising three linkage rods in that the motion of the baffle 31 may be guided along a programmed path. For example, to avoid interference at the beginning of the opening of the door 3 between the displaceable baffle 3 and the visor 40, curved slot 39 may define an inactive motion-free zone towards the beginning area of the cam slot 39.

At the end of the opening of the door, the baffle 31 is located at the downstream portion of the outer surface 4 of the door 3. Because the linkage kinematics in this design causes a closing motion of the baffle against the door surface, a seal may be mounted on the downstream side of the baffle 31. In this case a pressurized zone is created on the upstream side of the baffle 31 and a low pressure zone is created at the downstream or rear side of this baffle. This design allows improvement of the aerodynamic performance of this arrangement. Moreover, the baffle 31 may comprise at least one aperture that may be associated with at least one louver 41 that orients the reverse flow crossing the aperture in a manner similar to the mechanism disclosed in European published application No. EP 0 301 955.

FIG. 9 through 12 show another embodiment of the invention. In accordance with this embodiment, at least two linkage rods 43 and 44 hingedly connected to the door 3 and pivoted at 45 and 46 guide and orient the baffle 42 at pivot points 47 and 48. A linkage rod 49 connected to and hinged to the fixed structure of the thrust reverser at 50 drives the baffle 42 upon displacement of the door 3. Its hinge point on the baffle is shown at 48 in FIGS. 9–12, although such hinge point could be located at any other location on the movable subassembly as may be desired or proper.

Depending on the selected aerodynamic contours, the advantage of this configuration is that it enables an increase in the exhaust cross-section 53 exiting the interior of the door 3 and a larger number of vanes 51, whereby the aerodynamic effectiveness of the flow 13 passing through the duct 10 is improved.

It will be evident that, depending on various requirements, the baffle 42 may be mounted higher to increase the blocking effect, with the surface constituting part of the outer cowling, if desired, being extended in the upstream direction to increase the exhaust area 53 (FIG. 10) of the inside of the door 3.

The displaceable baffles 24, 31 and 42 may be driven independently of the door 3 by any kind of system known to one skilled in the art and they can be controlled either simultaneously or sequentially, and before or after opening of the door 3.

Accordingly, it is technically conceivable to drive the door indirectly by the movable baffles in accordance with the above-described configurations.

Preferred embodiments of the invention have been described above. However, it is to be understood that various other modifications to the preferred embodiments could be made by any person skilled in the art without leaving the scope of the invention as defined in the claims that follow.

We claim:

1. A thrust reverser for a bypass type turbojet engine that includes a cowling and a bypass or exhaust flow duct within the cowling, comprising;

hollow thrust deflector scoop doors forming part of the cowling when in a closed position and dipping at their upstream ends into the bypass flow stream when pivotally actuated into the bypass flow duct to thereby deflect bypass flow along outer surfaces of the doors outwardly through openings created in the cowling by the pivoting motion of each of the doors into a respective thrust reverse position, the doors also including inner ducts forming deflector scoops that further deflect bypass flow outwardly when the doors are pivoted into said respective thrust reverse positions;

movable flow deflecting baffles associated with each door; and baffle motion control devices associated with each door and arranged to move each baffle above the outer surface of its associated door when the door is pivoted to its thrust reverse position, each baffle directing flow of the bypass stream deflected by the associated door in such a manner as to minimize or eliminate aerodynamic interference between deflected bypass flow moving through the door and bypass flow deflected by the outside surface of the door.

2. A thrust reverser according to claim 1, wherein said baffles are located towards upstream ends of the doors with which they are associated and at least in part form part of the exterior surface of the cowling when the doors are in the closed position.

3. A thrust reverser according to claim 2, wherein each of said baffles is supported on and driven by its associated door by pivotable linkage rods, said linkage rods comprising part of said baffle motion control device.

4. A thrust reverser according to claim 3, wherein each of said baffle motion control devices includes at least one additional pivoted linkage rod connected between the baffle and fixed structure.

5. A thrust reverser according to claim 1, wherein each baffle includes an upstream edge and the baffle motion control device is arranged so as to cause each baffle upstream edge to move inwardly toward the duct interior upon motion of each associated door towards a thrust reverse position.

6. A thrust reverser according to claim 1, wherein each baffle includes a downstream edge and each baffle motion control device is arranged so as to cause each baffle downstream edge to move inwardly toward the duct interior upon motion of each associated door towards a thrust reverse position.

7. A thrust reverser according to claim 1, wherein each baffle is located between upstream and downstream ends of the outer surface of its associated door when the door is in its closed position.

8. A thrust reverser according to claim 1, wherein each baffle is located downstream of the outer surface of its associated door when the door is in its closed position.

9. A thrust reverser according to claim 8, wherein the engine cowling includes a fixed visor extending in an upstream direction and which is associated with a rear shroud of the thrust reverser, and each baffle is located at least in part under the visor when its associated door is in the closed position.

10. A thrust reverser according to claim 9, wherein each baffle includes a downstream end and a louvered aperture, said downstream end of each baffle being located in sealing contact with the outer surface of its associated door when the door is in its thrust reverse position.

11. A thrust reverser according to claim 8, wherein, when the doors are in their closed position, each baffle is located between a downstream end of a respective door outer surface and an upstream end of the visor.

12. A thrust reverser according to claim 8, wherein each baffle motion control device is connected to and driven by motion of a respective door, and includes at least two linkage rods pivotally hinged at their ends to door and baffle structure, at least one of said linkage rods also including a cam follower roller; a cam guide slot associated with fixed structure adjacent each door, each of said follower rollers disposed in a respective cam slot for guiding motion of its associated linkage rod; each of said baffles being located adjacent the outlet of the inner duct of its associated door when the door is located in its thrust reverse position.

13. A thrust reverser according to claim 8, wherein each baffle is carried by its respective door and further wherein each baffle motion control device is connected to and driven by motion of its respective door; each baffle motion control device also including at least a pair of linkage rods pivotally hinged at their ends to door and baffle structure, and a third pivoting linkage rod pivotally connecting a respective baffle to a fixed pivot point.

14. A thrust reverser according to claim 1, wherein each baffle motion control device is operable independently of the door associated with the baffle.

15. A thrust reverser according to claim 1, wherein each baffle motion control device is arranged to actuate pivotal motion of a respective door.

* * * * *